(12) United States Patent
Coccia et al.

(10) Patent No.: US 11,080,717 B2
(45) Date of Patent: Aug. 3, 2021

(54) METHOD AND SYSTEM FOR GUIDING AGENT/CUSTOMER INTERACTIONS OF A CUSTOMER RELATIONSHIP MANAGEMENT SYSTEM

(71) Applicant: Accenture Global Solutions Limited, Dublin (IE)

(72) Inventors: Davide Coccia, Milan (IT); Davide Guglielmo Bellini, Milan (IT)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 132 days.

(21) Appl. No.: 16/592,194

(22) Filed: Oct. 3, 2019

(65) Prior Publication Data

US 2021/0103933 A1 Apr. 8, 2021

(51) Int. Cl.
G06Q 30/00 (2012.01)
G06N 20/00 (2019.01)
G06Q 30/06 (2012.01)

(52) U.S. Cl.
CPC .......... *G06Q 30/016* (2013.01); *G06N 20/00* (2019.01); *G06Q 30/0631* (2013.01)

(58) Field of Classification Search
None
See application file for complete search history.

(56) References Cited

U.S. PATENT DOCUMENTS

| | | |
|---|---|---|
| 5,535,256 A | 7/1996 | Maloney |
| 6,012,058 A | 1/2000 | Fayyad et al. |
| 6,049,599 A | 4/2000 | McCausland et al. |
| 6,449,612 B1 | 9/2002 | Bradley et al. |
| 6,470,335 B1 | 10/2002 | Marusak |
| 6,542,881 B1 | 4/2003 | Meidan et al. |
| 6,675,164 B2 | 1/2004 | Kamath et al. |
| 6,728,728 B2 | 4/2004 | Spiegler et al. |
| 6,836,773 B2 | 12/2004 | Tamayo et al. |
| 7,698,163 B2 | 4/2010 | Reed et al. |
| 9,420,100 B2 | 8/2016 | Bellini et al. |

(Continued)

FOREIGN PATENT DOCUMENTS

| | | |
|---|---|---|
| EP | 1 168198 | 1/2002 |
| EP | 3032472 A1 | 6/2016 |

(Continued)

OTHER PUBLICATIONS

Wikipedia.org, "Next-best-action marketing", pp. 1-3, last modified Sep. 22, 2014, http://en.wikipedia .org/w/index .php?title=Next-bestactionmarketinq&0ldid=626612318.

(Continued)

*Primary Examiner* — Mila Airapetian
(74) *Attorney, Agent, or Firm* — Brinks Gilson & Lione

(57) ABSTRACT

A customer assistance guidance system includes an interface for communicating information to a customer relationship management (CRM) system. The system receives state information from the CRM system that defines a current interaction state between an agent of the CRM system and a customer. The system may predict, based on the state information, a next interaction state between an agent of the CRM system and the customer. The system may communicate the predicted next interaction state to the CRM system to facilitate the suggestion of a next course of action for the agent to perform.

20 Claims, 6 Drawing Sheets

(56) References Cited

U.S. PATENT DOCUMENTS

| | | |
|---|---|---|
| RE47,652 E | 10/2019 | Bellini et al. |
| 2002/0165755 A1 | 11/2002 | Kitts |
| 2003/0200135 A1 | 10/2003 | Wriqht |
| 2003/0208468 A1 | 11/2003 | McNab |
| 2004/0034558 A1 | 2/2004 | Eskandari |
| 2004/0039593 A1 | 2/2004 | Eskandari |
| 2004/0073520 A1 | 4/2004 | Eskandari |
| 2005/0154748 A1 | 7/2005 | Kraiss |
| 2005/0203768 A1 | 9/2005 | Florance et al. |
| 2005/0251408 A1 | 11/2005 | Swaminathan et al. |
| 2007/0156673 A1 | 7/2007 | Maqa et al. |
| 2007/0185867 A1 | 8/2007 | Maga et al. |
| 2011/0307257 A1 | 12/2011 | Pereg et al. |
| 2014/0365305 A1 | 12/2014 | Arditi et al. |
| 2015/0256675 A1* | 9/2015 | Sri .................. H04L 12/1827 379/265.09 |
| 2016/0239848 A1* | 8/2016 | Chang ................ G06Q 30/016 |
| 2016/0294952 A1* | 10/2016 | Bodell ................ H04L 67/146 |
| 2019/0124202 A1 | 4/2019 | Dubey et al. |
| 2021/0012407 A1* | 1/2021 | Kumar .................. G06N 20/10 |

FOREIGN PATENT DOCUMENTS

| | | |
|---|---|---|
| WO | WO 01/22265 | 3/2001 |
| WO | WO 01/29692 A2 | 4/2001 |

OTHER PUBLICATIONS

Kleissner, C., "Data Mining for the Enterprise," Conference on System Sciences Proceedings of the Thirty-First Hawaii International Conference on Kohala Coast, HI, vol. 7, Jan. 6, 1998, pp. 295-304.

Mitchell, Tom M., "Machine Learning and Data Mining," Communications of the Association for Computing Machinery, ACM, New York, NY, vol. 42, No. 11, Nov. 1999, pp. 30-36.

Sampaio, Pedro R. Falcone, et al.: "Business Process Design and Implementation for Customer Segmentation e-Services," Proceedings of the 2005 IEEE International Conference on E-Technology, E-Commerce and E-Service, EEE-05, Hong Kong, China, Mar. 29-Apr. 1, 2005, pp. 228-234, including Table of Contents pp. v-xiv.

Nadinic, Berislav et al., "New Possibilities for Knowledge Discovery in Telecommunication Companies," Eighth International Conference on Telecommunications, ConTEL 2005, Zagreb, Croatia; Jun. 15-17, 2005, pp. 259-263.

Roiger, Richard J. et al., "A Majority Rules Approach to Data Mining," Proceedings of International Conference on Intelligent and Cooperative Information Systems, Copyright 1997, pp. 100-107.

Extended European Search Report in Europe Application No. 20192232.5, dated Nov. 10, 2020, 10 pages.

* cited by examiner

METHOD AND SYSTEM FOR GUIDING AGENT/CUSTOMER INTERACTIONS OF A CUSTOMER RELATIONSHIP MANAGEMENT SYSTEM

BACKGROUND

Field

This application generally relates to customer relationship management systems. In particular, this application describes a method and system for guiding agent/customer interactions of a CRM system.

Description of Related Art

Companies use customer relationshop management (CRM) systems to maintain customer biographic information, customer order history, customer complaints, listings of customer products and services, etc. with the aim of improving interactions between agents and customers and ultimately growing sales. CRM systems may present some of this information to an agent of the CRM system via one or more dashboards during interactions with a customer. The dashboards may be configured to guide the agent through various predetermined steps/actions when dealing with the customer regardless of who the customer is.

DETAILED DESCRIPTION

An agent of a CRM system may be presented with situations for which he is unprepared. For example, the user may have complained in the past regarding the quality of a service and may be looking for alternatives. In this case, the agent may have to search past records associated with the customer to determine the customer's service history and/or information regarding any prior complaints. In doing so, the agent may need to place the customer on hold to research possible soloutions to the issue the customer is having and to find suitable alternatives for the customer to consider. This may also involve working with more experienced agents better suited at finding solutions to such issues. This added delay only adds to the frustration experienced by the customer. This in turn could lead to a loss of goodwill and eventually revenue for the company.

The embodiments described below overcome the problems described above by providing a CRM guidance system that utilizes machine learning algorithms to monitor the current state of interaction between an agent and a customer and to predict a next best course of action for the agent to take in dealing with the customer. The system also utilizes machine learning algorithms to predict products that may be of interest to the customer. The predictions and suggestions are communicated essentially in real-time to a dashboard used by the agent for dealing with the customer. This in turn facilitates providing rapid and proven solutions to issues the customer may be having.

Figure 1:
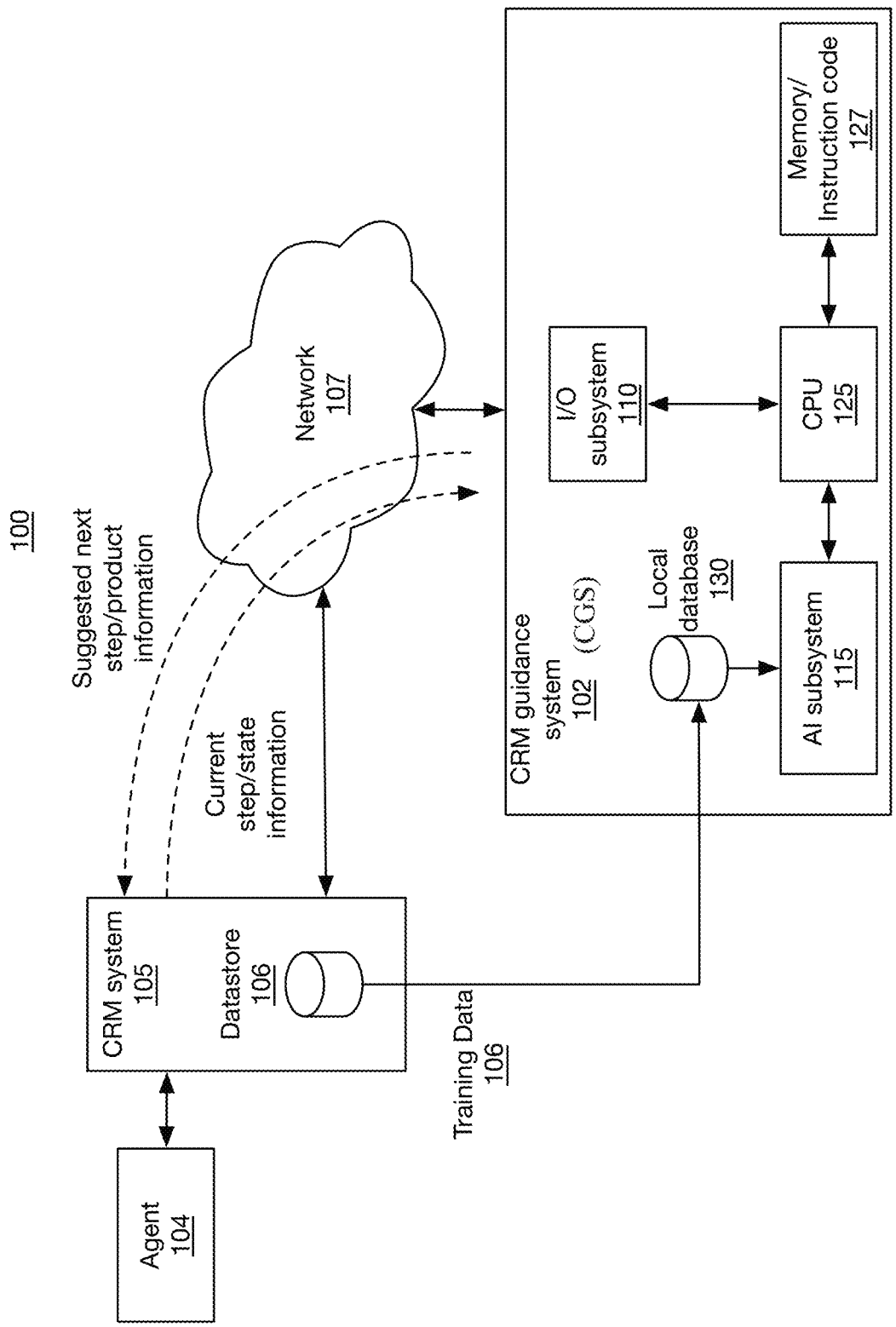
FIG. 1 illustrates an example environment in which a CRM guidance system (CGS) operates.

FIG. 1 illustrates an example environment 100 that includes various systems/devices that enhance interaction between an agent and a customer. Example systems/devices of the environment 100 include a customer assistance guidance system (CGS) 102, an agent terminal 104, and a customer relationship management (CRM) system 105.

The various entities of the environment 100 may communicate with one another via a network 107, such as the Internet and may correspond to computer systems such as an Intel®, AMD®, or PowerPC® based computer system or a different computer system and can include application specific computer systems. The computer systems may include an operating system, such as Microsoft Windows®, Linux, Unix® or other operating system. Any terminals described herein may be desktop PCs and/or mobile terminals.

The CRM system 105 may correspond to one or more computers that operate in a networked environment within an enterprise that collectively integrate and automate sales, marketing, and customer support. The CRM system 105 may generate one or more dashboards that provide to an agent an overall view of these and other functions as they relate to a given customer. For example, the dashboards may provide customer biographic information, past sales, previous marketing efforts, and more, summarizing all of the relationships between the customer and the company. In this regard, the CRM system 105 may include one or more datastores 106 for storing this information.

In an embodiment, as least some of the information stored in the datastore(s) 106 may be communicated to the CGS 102. The information may be communicated in real-time or in batches. For example, the information may be communicated daily, weekly, etc. In this regard, the CRM system 105 may be configured to facilitate communicating the information to the CGS 102 via one or more APIs of the CGS 102. For example, the CRM system 105 may be configured to communicate with the CGS 102 via an API such as a webserver API, a SOAP-based web service, a RESTful API, and/or a different type of API. Parameters communicated between the systems may be formatted in XML, JSON, and/or in a different format.

The CGS 102 may include an input/output subsystem 110, an A1 subsystem 115, and a processor 125. The CGS 102 may include other subsystems.

The I/O subsystem 110 of the CGS 102 includes one or more input, output, or input/output interfaces and is configured to facilitate communications with entities outside of the CGS 102. In this regard, the I/O subsystem 110 may be configured to dynamically determine the communication methodology utilized by entities of the environment 100 and may communicate information to the entities with an interface that uses a determined communication methodology. For example, the I/O subsystem 110 may determine that a first entity utilizes a RESTful API and may, therefore, communicate with the entity using an interface that uses a RESTful communication methodology.

The I/O subsystem 110 may implement a web browser to facilitate generating one or more web-based interfaces through which users of the CGS 102, CRM system 105, and/or other systems may interact with the CGS 102. The web browser may implement a web services interface to facilitate automating some of the web-based functionality via a computer. For example, one or more of the entities of the environment 100 may utilize the web services interface to access information stored by the CGS 102 and/or to communicate information to the CGS 102.

The A1 subsystem 115 may correspond to hardware, software, or a combination thereof that is specifically configured to implement or assist in the implementation of various supervised and unsupervised machine learning models. The machine learning models may be based on algorithms such as a Holt-Winters algorithm, an exponential time smoothing (ETS) algorithm, an artificial neural network (ANN), a recurrent neural network (RNN), a seasonal auto regressive moving average (SARIMA) algorithm, a network of long short-term memories (LSTM), a gated recurring unit (GRU) algorithm. The A1 Subsystem 115 may implement other machine learning and/or A1 algorithms.

The A1 subsystem 115 may be further configured to perform or assist in the performance of various natural language processing techniques such as latent Dirichlet allocation (LDA) to identify topics associated with conversations, hierarchical density based cluster analysis (H-DB-SCAN) to group conversations under one or more topics, Knuth-Morris-Pratt string searching to locate and extract occurrences of a certain words within conversations, possibly linear clustering algorithms to mine text data, and/or other techniques.

The processor 125 executes instruction code stored in a memory device 127 for coordinating activities performed between the various subsystems. The processor 125 may correspond to a stand-alone computer system such as an Intel®, AMD®, or PowerPC® based computer system or a different computer system and can include application specific computer systems. The computer systems may include an operating system, such as Microsoft Windows®, Linux, Unix® or other operating system.

It is contemplated that the I/O subsystem 110, A1 subsystem 115, and any other subsystem referenced herein may correspond to a stand-alone computer system such as an Intel®, AMD®, or PowerPC® based computer system or a different computer system and can include application specific computer systems. The computer systems may include an operating system, such as Microsoft Windows®, Linux, Unix® or other operating system. It is also contemplated that operations performed on the various subsystems may be combined into a fewer or greater number of subsystems to facilitate speed scaling, cost reductions, etc.

Figure 2:
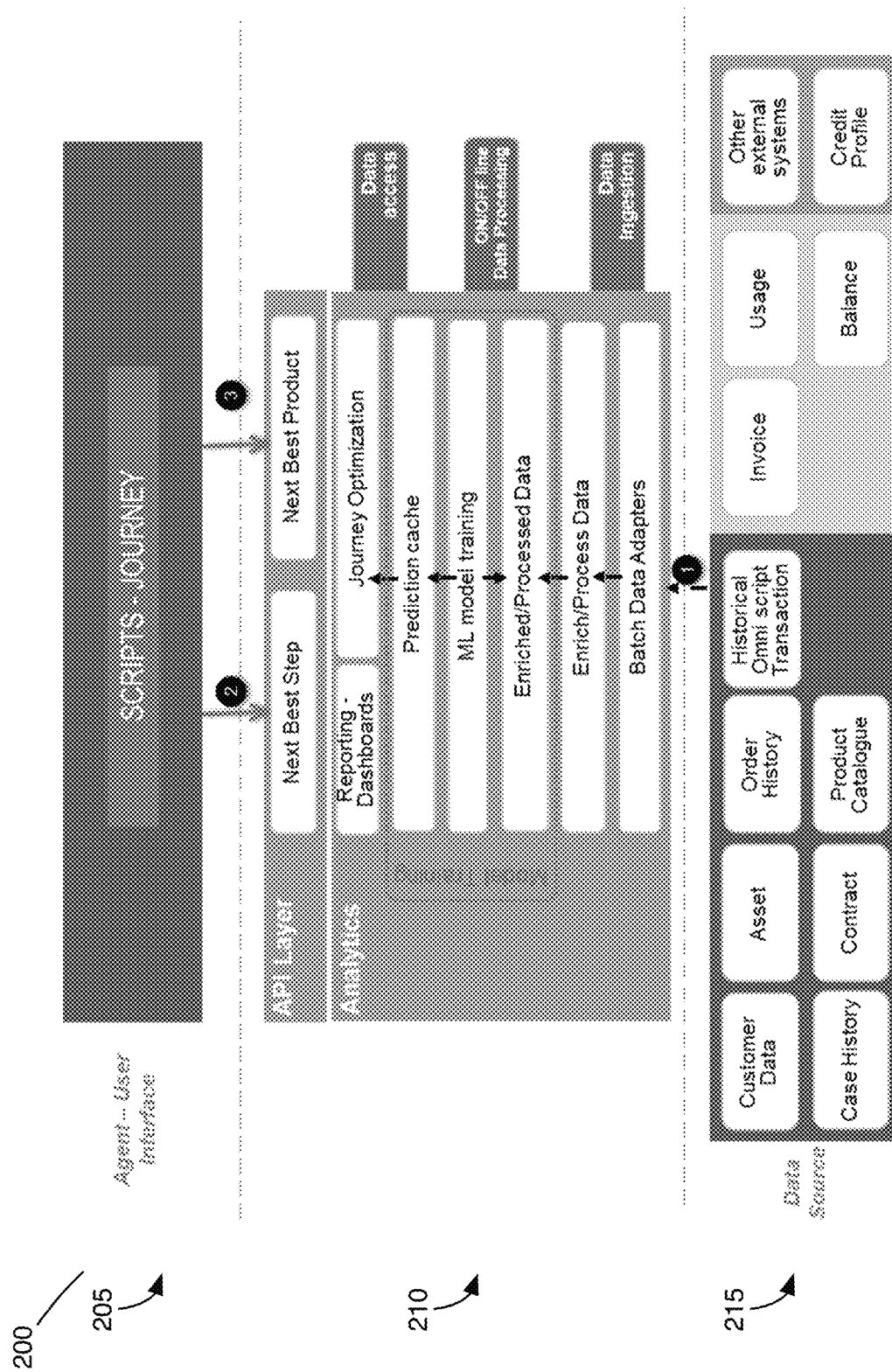
FIG. 2 illustrates is logical representation of communication flow between the CGS and a CRM system of the environment.

FIG. 2 illustrates is logical representation 200 of communication flow between the CGS 102 and the CRM system 105. The top section 205 of the representation 200 represents scripts executed by the CRM system 105 that guide the agent 104 when interacting with the customer. In one implementation, the CRM system 105 corresponds to a Salesforce® CRM system and the scripts corresponds to Omniscripts 6 that are executed by a plugin module provided by Vlocity®. Scripts executed by the plugin may generate or cause the CRM system 105 to generate various dashboards that facilitate interactions between the agent 104 and the customer.

The middle section 210 of the representation 200 represents logic implemented by the A1 subsystem 115 and/or other subsystems of the CGS 102. The logic includes analytics logic for predicting a next best step/interaction state between the agent and the customer and for selecting a best product(s) to suggest to the customer (e.g., based on the predicted next best step/interaction state between the agent and the customer). For example, the analytics logic may include a machine learning model that is trained with information received from the datastore 106 of the CRM system 105.

The analytics logic also includes data adapters for receiving data in batches from different types of datastores and logic for enriching and processing data received from the data sources. For example, the data may be pruned to remove duplicates, spelling mistakes in the data may be corrected, phrases of text in the data may be normalized, etc.

The logic implemented by the A1 subsystem 115 and/or other subsystems of the CGS 102 may also include an application program interface (API) that facilitates communicating information between the analytics logic of the CGS 102 and the scripts executed by the CRM system 105. The API defines parameters that facilitate communicating the next step/interaction state and the best product suggestion(s) from the CGS 102. The API also may define parameters that facilitate obtaining training data from the datastore 106 of the CRM system 105 or other systems.

The following tables illustrate example parameters defined by the API that are passed between the CGS 102 and the CRM system 105 to facilitate obtaining by the CRM system 105 the next step/interaction state between the agent and the customer and the best product suggestion(s).

Table 1 describes example parameters utilized for requesting the next step/interaction state between the agent and the customer.

TABLE 1

| Name | Description | Type | Mandatory | Nullable | Sample |
|---|---|---|---|---|---|
| processId | omniscript process Id | String | Y | N | "a299E000000WkEWQA0" |
| taskId | omniscript current step id | String | Y | N | "RenewalCustomerDevice" |
| shoppingCartId | Cart id | String | Y | N | "8019E000000KlxbQAC" |
| sessionId | Id of the current interaction with the customer, can be null in the first interaction | String | Y | N | null |
| accountId | Id of the customer line | String | Y | Y | "0019E00000K8Dmo001" |
| channel | The channel id where the recommendation is used | String | Y | N | "shop" |
| mandatoryTask | Next task Id populated only when it is mandatory | String | N | N | "InstallmentsExtension" |
| products | Response list | Object list | N | N | |
| productCode | Product id of the offer in DB | String | Y | N | "38efh328" |
| propositionId | Product id of the offer in BI system | Integer | Y | N | 98 |

TABLE 1-continued

| Name | Description | Type | Mandatory | Nullable | Sample |
|---|---|---|---|---|---|
| position | Position in which the offer need to be proposed in front end | Integer | Y | N | 1 |
| response | Response of the client to the proposition: "accepted" if the user added the offer to the cart, "declined" otherwise | String | Y | N | "accepted" |
| agentId | Id of the agent interacting with the customer | String | Y | N | "agent001" |

Sample JSON data that may be communicated in a request to obtain the next step/interaction state is as follows:

JSON Next Step Request

```
{
    "processId": "a299E000000WkEWQA0",
    "taskId": "RenewalCustomerDevice",
    "shoppingCartId": "8019E000000KlxbQAC",
    "sessionId": "sdfhcxx203",
    "accountId": "0019E00000K8Dmo001",
    "channel": "Shop",
    "agentId": "agent001",
    "mandatoryTask":" InstallmentsExtension",
    "products" : [
        {
            "productCode": "GoogleNest product code__",
            "propositionId": 37
```

JSON Next Step Request (continued)

```
            "position": 1,
            "response": "accepted"
        },
        {
            "productCode": "EagleHuaweiMate10__",
            "propositionId": 73,
            "position": 2,
            "response": "rejected"
        },
    ]
}
```

Table 2 describes example parameters utilized in the response to the request for the next step/interaction state.

TABLE 2

| Field Name | Description | Type | Mandatory | Nullable | Sample |
|---|---|---|---|---|---|
| resultCode | 0: Service executed successfully 1: Service execution failed (for error details refer to the error management paragraph) | Integer | Y | N | 0 |
| errorManagement | Error object | Object list | Y | N | |
| errorCode | The result error code | String | N | Y | |
| errorDescription | The result error description | String | N | Y | |
| processId | omniscript process Id | String | Y | N | "a299E000000WkEWQA0" |
| taskId | omniscript current step id | String | Y | N | "RenewalCustomerDevice" |
| shoppingCartId | Cart id | String | Y | N | "8019E000000KlxbQAC" |
| sessionId | Id of the current interaction with the customer, can be null in the first interaction | String | Y | N | "932fnc88wf4cw" |
| accountId | Id of the customer line | String | Y | Y | "0019E00000K8Dmo001" |
| nextTaskId | Id of the next step, or "END" | String | Y | N | "a1S9E0vrfg45003p5AQ" |
| parameters | Parameter list | Object list | Y | Y | |

TABLE 2-continued

| Field Name | Description | Type | Mandatory | Nullable | Sample |
|---|---|---|---|---|---|
| name | Name of the parameter | String | N | N | "installmentPeriod" |
| value | Value of the parameter | String | N | N | "24" |
| products | Product list | Object list | N | N | |
| productCode | Product id of the offer in DB | String | Y | N | "38efh328" |
| propositionId | Product id of the offer in BI system | Integer | Y | N | 98 |
| position | Position in which the offer need to be proposed in front end | Integer | Y | N | 1 |

Sample JSON data that may be communicated in a response to the request to obtain the next step/interaction state is as follows:

JSON Next Step Response

```
{
    "resultCode": 0,
    "errorManagement": { },
    "processId": "a299E000000WkEWQA0",
    "taskId": "Recommendation",
    "shoppingCartId": "8019E000000KlxbQAC",
    "sessionId": "sdfhcxx203",
    "accountId": "0019E00000K8Dmo001",
    "nextTaskId": "Installment id",
    "parameters": [
        {
            "name": "installmentPeriod",
            "value": "24"
        }
    ]
}
```

Table 3 describes example parameters utilized for requesting suggested products.

TABLE 3

| Name | Description | Type | Mandatory | Nullable | Sample |
|---|---|---|---|---|---|
| processId | omniscript process Id | String | Y | N | "a299E000000cbNqQAI" |
| taskId | omniscript current step id | String | Y | N | "renewalProcess" |
| shoppingCartId | Cart id | String | Y | N | "8019E000000KlxbQAC" |
| sessionId | Id of the current interaction with the customer, can be null in the first interaction | String | Y | N | null |
| accountId | Id of the customer line | String | Y | Y | "0019E00000K8Dmo" |
| channel | The channel id where the recommendation is used | String | Y | N | "shop" |
| agentId | Id of the agent interacting with the customer | String | Y | N | "agent001" |
| family | Identify the product family required for the step | String | Y | N | "Smartphone" |

Sample JSON data that may be communicated in a request to obtain suggested products is as follows:

JSON Suggested Products Request

```
{
    "processId": "a299E000000WkEWQA0",
    "taskId": "RenewalCustomerDevice",
```

-continued

JSON Suggested Products Request

```
    "shoppingCartId": "8019E000000KlxbQAC",
    "sessionId": "sdfhcxx203",
    "accountId": "0019E00000K8Dmo001",
    "channel": "Shop",
    "agentId": "agent001",
```

| JSON Suggested Products Request |
|---|
| "mandatoryTask":" InstallmentsExtension",<br>"products" : [<br>    {<br>        "productCode": "GoogleNest product code__",<br>        "propositionId": 37<br>        "position": 1,<br>        "response": "accepted"<br>    },<br>    {<br>        "productCode": "EagleHuaweiMate10__",<br>        "propositionId": 73,<br>        "position": 2,<br>        "response": "rejected"<br>    },<br>]<br>} |

Table 4 describes example parameters utilized in the response to the request for the suggested products.

TABLE 4

| Field Name | Description | Type | Mandatory | Nullable | Sample |
|---|---|---|---|---|---|
| resultCode | 0: Service executed successfully 1: Service execution failed (for error details refer to the error management paragraph) | Integer | Y | N | 0 |
| errorManagement | Error object | Object list | Y | N | |
|   errorCode | The result error code | String | N | Y | |
|   errorDescription | The result error description | String | N | Y | |
| processId | omniscript process Id | String | Y | N | "a299E000000WkEWQA0" |
| taskId | omniscript current step id | String | Y | N | "RenewalCustomerDevice" |
| shoppingCartId | Cart id | String | Y | N | "8019E000000KlxbQAC" |
| sessionId | Id of the current interaction with the customer, can be null in the first interaction | String | Y | N | "932fnc88wf4cw" |
| accountId | Id of the customer line | String | Y | Y | "0019E00000K8Dmo001" |
| nextTaskId | Id of the next step, or "END" | String | Y | N | "a1S9E0vrfg45003p5AQ" |
| parameters | Parameter list | Object list | Y | Y | |
|   name | Name of the parameter | String | N | N | "installmentPeriod" |
|   value | Value of the parameter | String | N | N | "24" |
| products | Product list | Object list | N | N | |
|   productCode | Product id of the offer in Eagle DB | String | Y | N | "38efh328" |
|   propositionId | Product id of the offer in BI system | Integer | Y | N | 98 |
|   position | Position in which the offer need to be proposed in front end | Integer | Y | N | 1 |

Sample JSON data that may be communicated in a response to obtain suggested products is as follows:

```
{
    "resultCode": 0,
    "errorManagement": [ ],
    "processId": "a299E000000cbNqQAI",
    "taskId": "RenewalCustomerDevice",
    "shoppingCartId": "8019E000000KlxbQAC",
    "sessionId": "sdfhcxx203",
    "accountId": "0019E00000K8Dmo",
    "parameters": [ ]
    "products": [
        {
            "productCode": "GalaxyS8 product code_",
            "propositionId": 98,
            "position": 1
        },
        {
            "productCode": "HuaweiMate10 product code_",
            "propositionId": 73,
            "position": 2
        },
        {
            "productCode": "Iphone8 product code_",
            "propositionId": 124,
            "position": 3
        }
    ]
}
```

The bottom section 215 of the representation 200 represents different data sources ingested by the analytics logic to train the machine learning model of the analytics logic to make the aforementioned predictions and suggestions. The data sources may store information associated with any number of customers. The information may include customer biographic information, customer assets (i.e., products owned/associated with the customer), customer order histories, case histories associated with customers, contract information associated with customers, and one or more product catalogs. Other information may be provided in the data sources. The aforementioned data sources may reside in one or more datastores 106 of the CRM system 105 or may reside within different systems.

In an implementation, ingestion of the data by the analytics logic may involve transferring data from various data repositories of the datastore 106 of the CRM system 105 to a local database 130 in the CGS 102 to be used as training data. The data may be transferred in batches and enriched and/or processed to, for example, remove duplicates, spelling mistakes in the data may be corrected, phrases of text in the data may be normalized, etc. These operations may be performed on a periodic basis such as daily, weekly, etc.

Table 5 below illustrates example tables of data that may be extracted from the datastore 106 of the CRM system 105.

The CRM table name corresponds to the name of table in the CRM system 105. The file path and file name are also provided. The Table Name column on the left corresponds to the name of a table to be created in the local database of the CGS 102 based on corresponding information of the CRM system 105.

Figure 3:
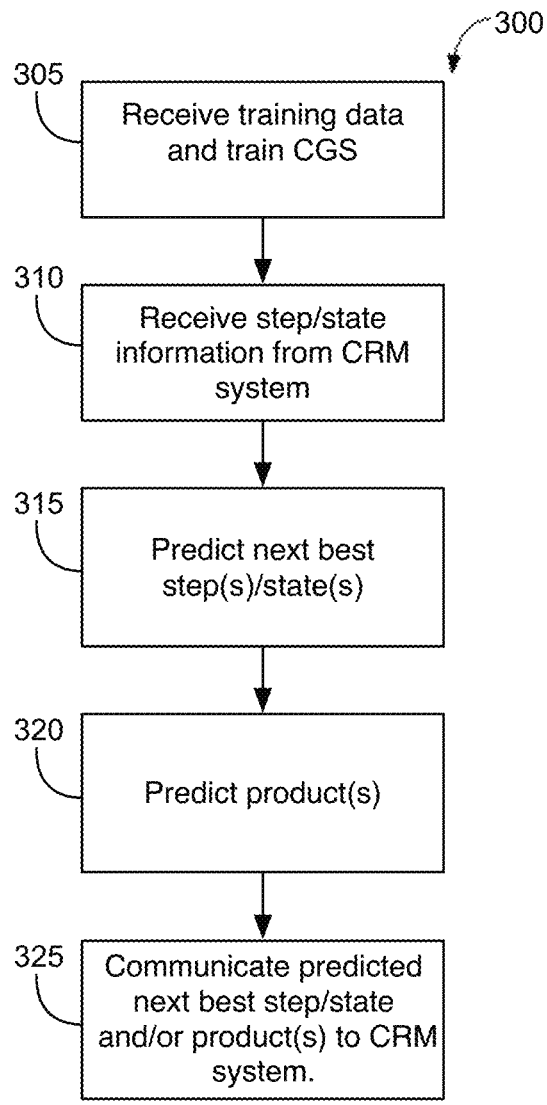
FIG. 3 illustrates operations performed by the CGS for training machine-learning models of the CGS and for suggesting interaction states and products to an agent of the CRM system.

FIG. 3 illustrates an embodiment of example operations 300 performed by the CPU 125 and/or other modules of the CGS 102 to facilitate providing guidance to the CRM system 105. In this regard, the operations may be implemented via instruction code stored in non-transitory computer readable media 127 that resides within the subsystems configured to cause the respective subsystems to perform the operations illustrated in the figures and discussed herein.

Referring to FIG. 3, at operation 305, training data may be received from the CRM system 105. The training data may be utilized to train the A1 subsystem 115 of the CGS 102 to facilitate predicting the next step/state of customer interaction and possible product suggestions.

For example, information may be extracted from one or more datastores 106 of the CRM system 105. The extracted information may be stored in a local database 130 of the CGS 102. Data stored to the local database 130 may include customer information associated with multiple customers such as customer biographic information, customer assets, customer order histories, case histories associated with customers, contract information associated with customers. Information obtained and stored may include one or more product catalogs. Other information may be obtained from the datastores 106 of the CRM system 105 or other systems. The local data may then be utilized to train a machine learning model of the A1 subsystem 115 to perform the aforementioned predictions and suggestions.

At operation 310, the CGS 102 may receive step/state information associated with a current state of interaction between an agent of the CRM system 105 and a customer. For example, a script (e.g., Omniscript®) executing on the CRM system 105 may present or cause to be presented a dashboard to the agent to facilitate renewing a customer's contract. The step/state information may include one of multiple scripted actions to guide the agent when interacting with the customer. The script may communicate a request to the CGS 102 to get a predicted next step of agent/customer interaction. The request may include one or more of the parameters specified in Table 1 and may include among other information an indication of the current interaction step/state between the agent and the customer. The parameters may be communicated in JSON, XML, and/or a different format.

TABLE 5

| Table Name | CRM Table Name | S3 Path | CSV Name |
|---|---|---|---|
| Account | Account | /account/account.csv | account.csv |
| Product | Product2 | /product/product.csv | product.csv |
| Asset | Asset | /asset/asset.csv | asset.csv |
| Case | Case | /case/case.csv | case.csv |
| Order | Order | /order/order.csv | order.csv |
| OrderItem | OrderItem | /OrderItem/OrderItem.csv | OrderItem.csv |
| PriceBook_entry | PriceBookEntry | /price_book_entry/price_book_entry.csv | price_book_entry.csv |
| Payment Method | vlocity_cmt_PaymentMethod_c | /payment_method/payment_method.csv | payment_method.csv |
| pricelist | vlocity_cmt_PriceList_c | /price_list/price_list.csv | Price_list.csv |
| pricelist_entry | vlocity_cmt_PriceListEntry_c | /price_list_entry/price_list_entry.csv | price_list_entry.csv |
| pricing_element | vlocity_cmt_PricingElement_c | /pricing_element/pricing_element.csv | pricing_element.csv |
| pricing_variable | vlocity_cmt_PricingVariable_c | /pricing_variable/pricing_variable.csv | pricing_variable.csv |

At operation 315, the CGS 102 may utilize machine learning logic and other analytics to predict next best step(s)/state(s) or action(s) for the agent to enter into with the customer. In some implementation, one or more predefined business rules may be subsequently applied to further refine the prediction to a final next best step.

At operation 320, the CGS 102 may further utilize the machine learning logic and analytics to predict product(s) for offering/suggesting to the customer (e.g., based on the predicted next best step(s) or state(s) for the agent to enter into with the customer). Prediction of the product may occur upon receiving a request from the CRM system 105 to get a suggested product. The request may include one or more of the parameters specified in Table 3. The parameters may be communicated in JSON, XML, and/or a different format.

At operation 325, one or more responses including the predictions/suggestions may be communicated to the script executing on the CRM system 105 (e.g., on an agent device 104). The response(s) may include one or more of the parameters specified in Tables 2 and 4 and the parameters in the response(s) may be communicated in JSON, XML, and/or a different format.

Upon receiving the responses, the script may update the dashboard presented to the agent to indicate the suggested next step(s)/state(s) of customer interaction along with a listing of one or more suggested products, if requested by the script.

Figure 6:
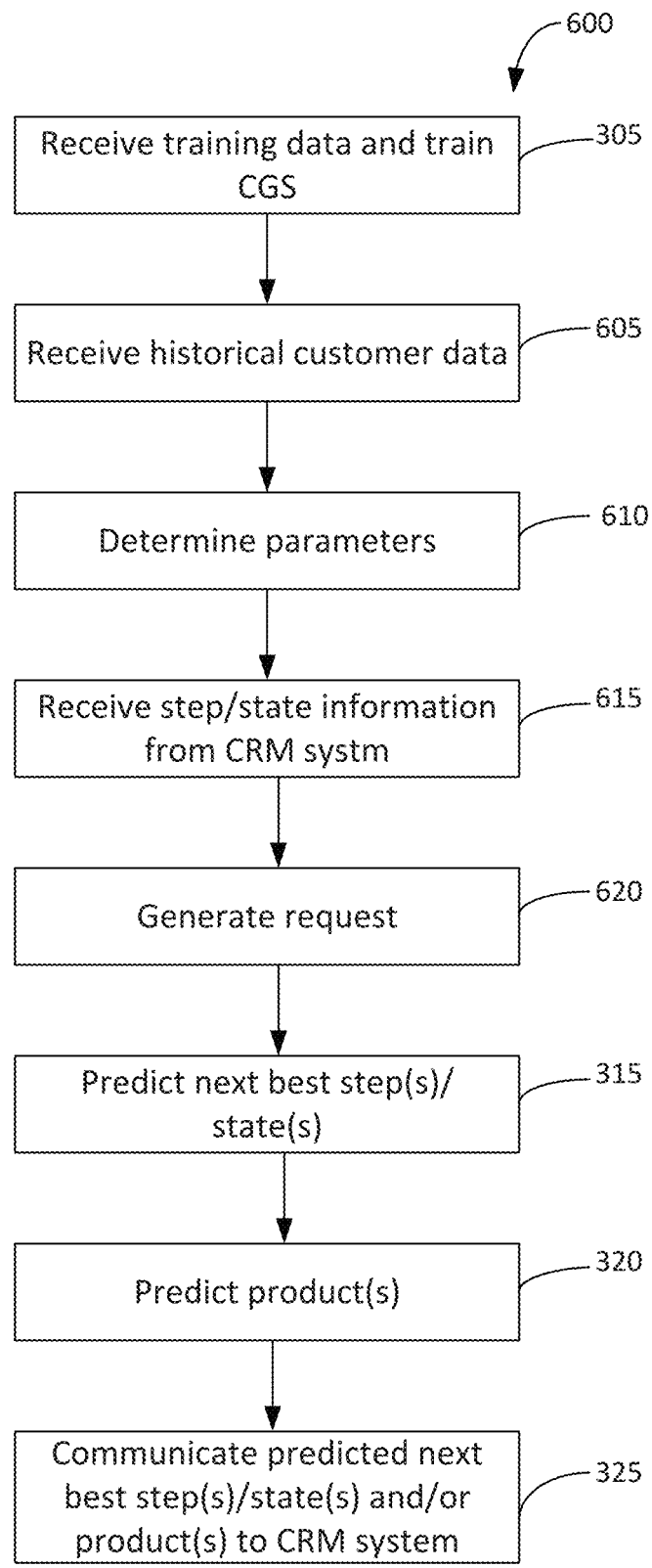
FIG. 6 illustrates operations performed by the CGS for using historical customer data to predict next best interaction step(s)/state(s) and product(s) in order to facilitate the interaction between an agent of the CRM system and a customer.

FIG. 6 illustrates another embodiment of example operations 600 performed by the CPU 125 and/or other modules of the CGS 102 to facilitate providing guidance to the CRM system 105. In this regard, the operations may be implemented via instruction code stored in non-transitory computer readable media 127 that resides within the subsystems configured to cause the respective subsystems to perform the operations illustrated in the figures and discussed herein.

Referring to FIG. 6, at operation 305, training data may be received from the CRM system 105. The training data may be utilized to train the A1 subsystem 115 of the CGS 102 to facilitate predicting the next step/state of customer interaction and possible product suggestions. For example, information may be extracted from one or more datastores 106 of the CRM system 105. The extracted information may be stored in a local database 130 of the CGS 102. Data stored to the local database 130 may include customer information associated with multiple customers such as customer biographic information, customer assets, customer order histories, case histories associated with customers, contract information associated with customers. Information obtained and stored may include one or more product catalogs. Other information may be obtained from the datastores 106 of the CRM system 105 or other systems. The local data may then be utilized to train a machine learning model of the A1 subsystem 115 to perform the aforementioned predictions and suggestions.

At operation 605, the CGS 102 may receive historical customer relationship management data from the CRM system that defines historical information in relation to a customer, such as customer biographic information, customer assets, customer order histories, case histories associated with the customer, and contract information associated with the customer.

At operation 610, the CGS 102 may determine one or more parameters based on the historical customer relationship management data received at operation 605. The parameters (e.g., as shown in Tables 1-4) are pre-defined to facilitate communication between the CGS and the CRM system.

At operation 615, the CRM system 105 may receive step/state information associated with a current state of interaction between an agent of the CRM system 105 and a customer. For example, a script (e.g., Omniscript®) executing on the CRM system 105 may present or cause to be presented a dashboard to the agent to facilitate renewing a customer's contract. The step/state information may include one of multiple scripted actions to guide the agent when interacting with the customer.

At operation 620, the script may generate and communicate a request to the CGS 102 to get a predicted next step/state of agent/customer interaction. The request may include one or more of the determined parameters (e.g., specified in Table 1) and may include among other information an indication of the current interaction step/state between the agent and the customer. The parameters may be communicated in JSON, XML, and/or a different format.

At operation 315, in response to the request, the CGS 102 may utilize machine learning logic and other analytics to predict next best step(s) or state(s) for the agent to enter into with the customer, based on the received historical customer relationship management data and the generated request. In some implementation, one or more predefined business rules may be subsequently applied to further refine the prediction to a final next best step/state.

At operation 320, the CGS 102 may further utilize the machine learning logic and analytics to predict product(s) for offering/suggesting to the customer. The product(s) may be predicted based on the predicted next best step(s) or state(s) for the agent to enter into with the customer. Prediction of the product(s) may occur upon receiving a request from the CRM system 105 to get a suggested product. The request may include one or more of the determined parameters (e.g., specified in Table 3). The parameters may be communicated in JSON, XML, and/or a different format.

At operation 325, one or more responses including the predictions/suggestions may be communicated, in real time, to the script executing on the CRM system 105 (e.g., on an agent device 104) to facilitate suggesting a next course of action for the agent to perform. The response(s) may include one or more of the determined parameters (e.g., specified in Tables 2 and 4) and the parameters in the response(s) may be communicated in JSON, XML, and/or a different format.

Upon receiving the responses, the script may update the dashboard presented to the agent to indicate the suggested next step(s)/state(s) of customer interaction along with a listing of one or more suggested products, if requested by the script.

In various implementations, the CGS 102 and the CRM system 105 may improve the functioning of the underlying computer hardware. For example, by determining parameters based on the historical customer data, generating requests including the determined parameters and information of the current interaction state between the agent and the customer, and predicting the next best step(s)/state(s) and/or products based on the historical customer data and the generated request using machine learning algorithms will improve accuracy of the predication and improve the output of the computer used for prediction. The CGS 102 and the CRM system 105 are designed to improve the way a computer makes predictions based on historical data and specific requests.

Figure 4:
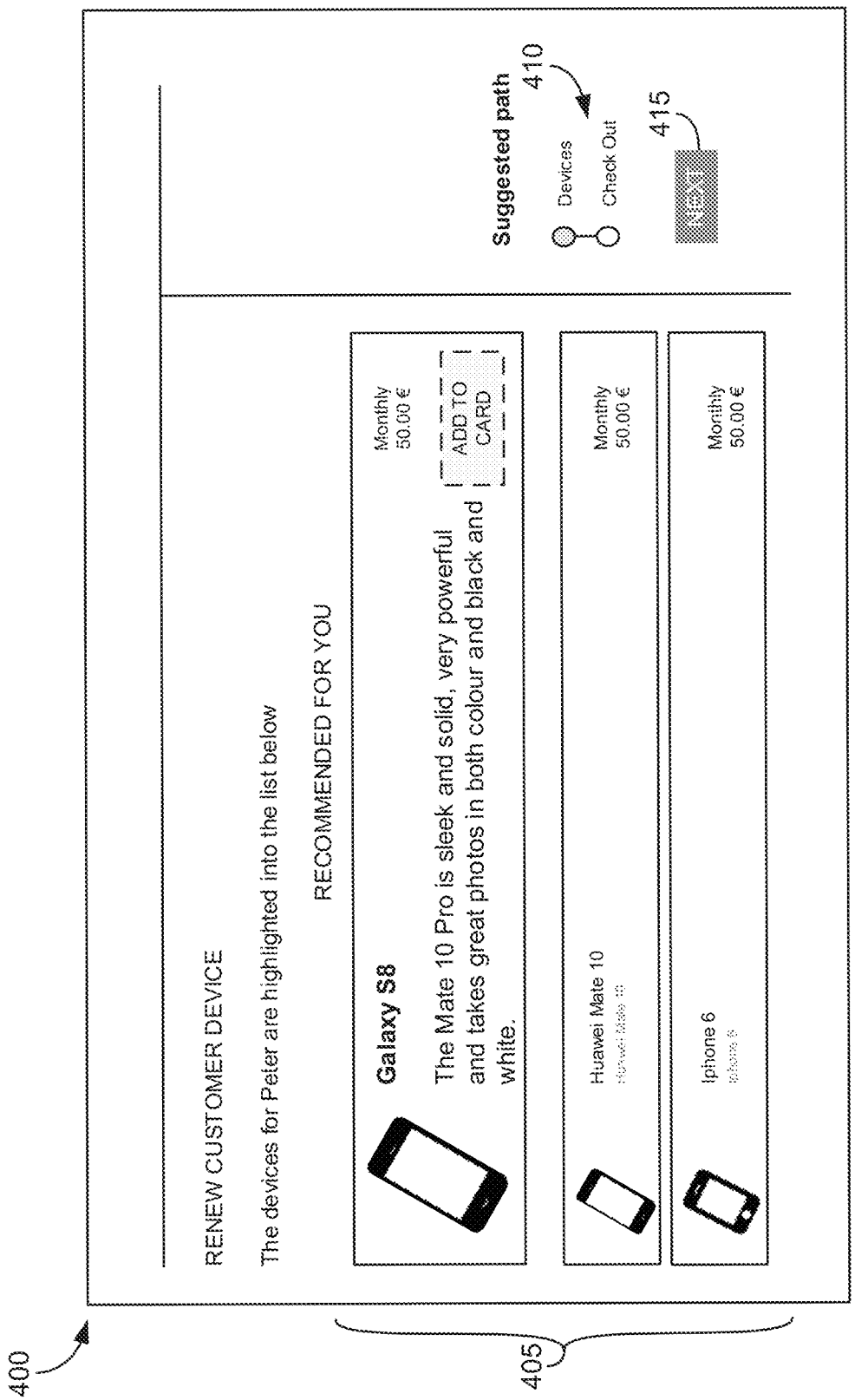
FIG. 4 illustrates an example dashboard that may be presented to the agent of the CRM system upon receiving the suggestions.

FIG. 4 illustrates an example dashboard 400 that may be generated by the script upon receiving the response from the CGS system. As shown, the dashboard 400 may include suggested paths 410 (i.e., next steps or actions) such as an option to review devices or an option to check out, along with a "next" control 415 to cause the script to proceed to the selected path. The suggested next steps/actions 410 may be different depending on the customer, the history associated with the customer, etc. The suggested next steps/actions 410 may vary depending on the current state of interaction between the agent and the customer. For example, the suggested next step 410 may depend in part on the type of dashboard being presented to the agent. In other words, the suggested next steps/actions 410 are predicted to be relevant next steps/actions that are learned from past dealings between agents and customers.

In addition to the suggested next step 410, the dashboard 400 may present a list of suggested products 405. The list of suggested products may be different for different customers and may depend on the customer, the history associated with the customer, etc. In other words, the suggested products are predicted to be relevant products that are learned from past dealings between agents and customers (e.g., products that are relevant to the suggested next step 410).

As shown, using a machine learning model trained on information associated with a variety of customers of the CRM system 105 facilitates providing an agent of the CRM system 105 with a next best course of action to take in dealing with the customer and also suggesting products that may be more relevant to the customer (e.g., more relevant in the next best course of action to take in dealing with the customer). The predictions and suggestions are communicated essentially in real-time to the dashboard used by the agent when interacting with the customer. Thus, the agent is able to provide rapid, relevant, and proven solutions to issues the customer may be having.

As one example, in the situation where an agent is helping a customer renew his smartphone contract, the agent may start the renewal process, present a list of smartphones to the customer, and recommend the Samsung Galaxy S8. If the customer accepts the suggestion, the agent/customer may click on icon "ADD TO CART," as shown in FIG. 4. Then to improve the experience of the customer, the agent may click on icon "NEXT," as shown in FIG. 4, to allow the CGS 102 to predict the next best step(s)/state(s) for the agent to enter into with the customer. For example, the CGS 102 may propose an IOT bundle, which is a TRY & BUY offer including Google Home+Nest (including setup) at a discounted price/leasing with direct invoicing in the bill. If the customer has an outstanding bill, then based on this historical customer data, the CGS may further predict the next best step(s)/state(s). Then, based on the predicted next best step(s)/state(s), the agent may propose an installment payment period extension. If the customer accepts the proposal and checks out the basket, the agent may then collect data for the customer's desired shipping address, manage the payment, and submit the order.

As another example, in the situation where an agent is helping a customer renew his smartphone contract, the agent may start the renewal process, present a list of smartphones to the customer, and recommend a Huawei Smartphone. After the customer accepts the suggestion, the CGS may predict the next best step(s)/state(s) based on the customer's need for more data. Based on a first predicted next best step/state, the agent may propose a tariff plan update on all the subscriptions. If the customer does not accept it, then based on a second predicted next best step/state, the agent may propose a shared data bundle that will allow the customer to control children's usage while reducing the overall expense. If the customer accepts this suggestion, then the agent may configure the customer's data bundle, adding group members and related thresholds. After the customer is satisfied with the data bundle, the agent may manage the payment and submit the order.

Figure 5:
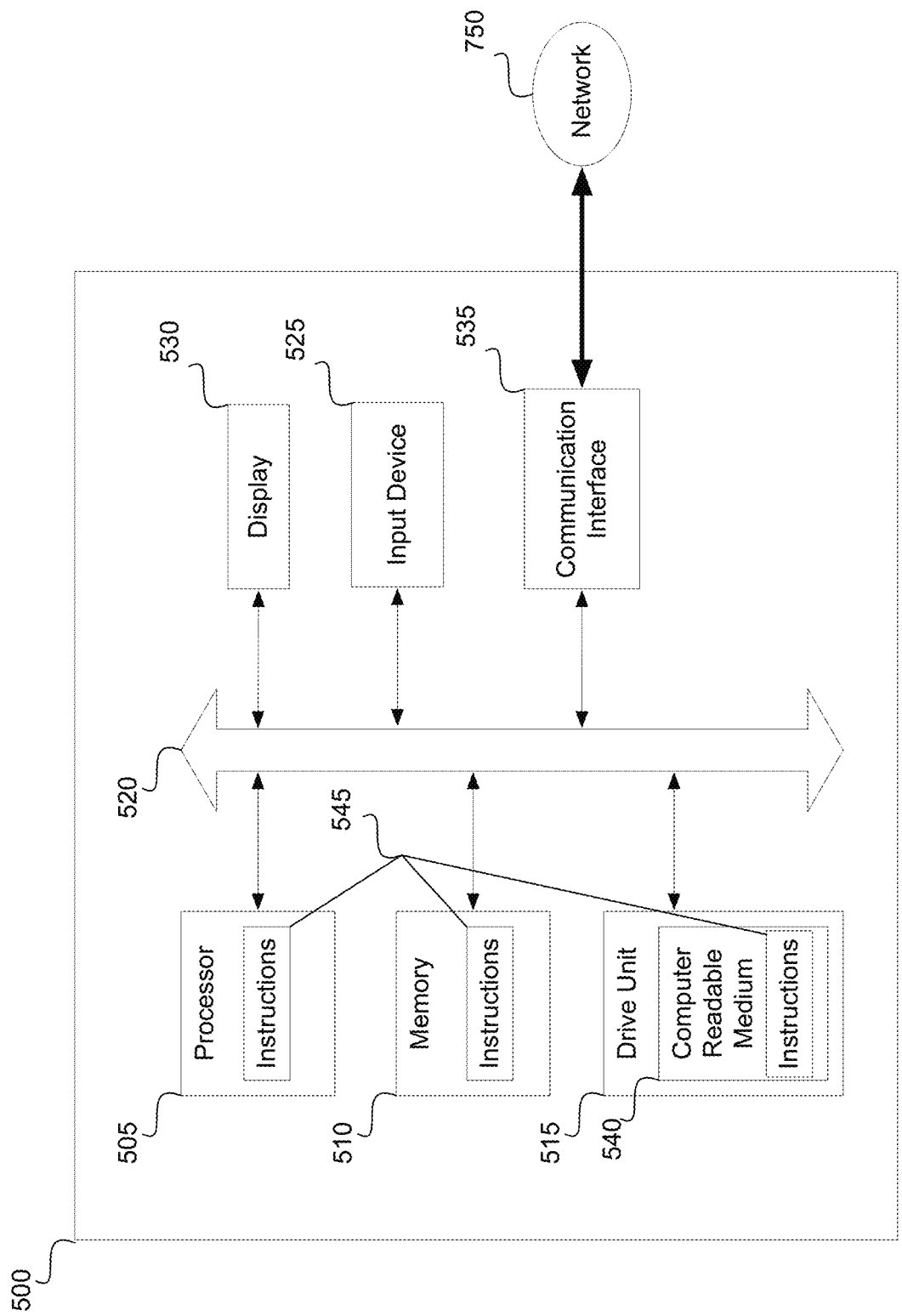
FIG. 5 illustrates an example computer system that may form part of or implement the systems described in the figures or in the following paragraphs.

FIG. 5 illustrates a computer system 500 that may form part of or implement the systems, environments, devices, etc., described above. The computer system 500 may include a set of instructions 545 that the processor 505 may execute to cause the computer system 500 to perform any of the operations described above. The computer system 500 may operate as a stand-alone device or may be connected, e.g., using a network, to other computer systems or peripheral devices.

In a networked deployment, the computer system 500 may operate in the capacity of a server or as a client computer in a server-client network environment, or as a peer computer system in a peer-to-peer (or distributed) environment. The computer system 500 may also be implemented as or incorporated into various devices, such as a personal computer or a mobile device, capable of executing instructions 545 (sequential or otherwise) causing a device to perform one or more actions. Further, each of the systems described may include a collection of subsystems that individually or jointly execute a set, or multiple sets, of instructions to perform one or more computer operations.

The computer system 500 may include one or more memory devices 510 communicatively coupled to a bus 520 for communicating information. In addition, code operable to cause the computer system to perform operations described above may be stored in the memory 510. The memory 510 may be a random-access memory, read-only memory, programmable memory, hard disk drive or any other type of memory or storage device.

The computer system 500 may include a display 530, such as a liquid crystal display (LCD), a cathode ray tube (CRT), or any other display suitable for conveying information. The display 530 may act as an interface for the user to see processing results produced by processor 505.

Additionally, the computer system 500 may include an input device 525, such as a keyboard or mouse or touchscreen, configured to allow a user to interact with components of system 500.

The computer system 500 may also include a disk or optical drive unit 515. The drive unit 515 may include a computer-readable medium 540 in which the instructions 545 may be stored. The instructions 545 may reside completely, or at least partially, within the memory 510 and/or within the processor 505 during execution by the computer system 500. The memory 510 and the processor 505 also may include computer-readable media as discussed above.

The computer system 500 may include a communication interface 535 to support communications via a network 550. The network 550 may include wired networks, wireless networks, or combinations thereof. The communication interface 535 may enable communications via any number of communication standards, such as 802.11, 802.12, 802.20, WiMAX, cellular telephone standards, or other communication standards.

Accordingly, methods and systems described herein may be realized in hardware, software, or a combination of hardware and software. The methods and systems may be realized in a centralized fashion in at least one computer system or in a distributed fashion where different elements are spread across interconnected computer systems. Any kind of computer system or other apparatus adapted for carrying out the methods described herein may be employed.

Various implementations may use the techniques and architectures described above.

A1 In an example, a customer assistance guidance system (CGS) includes: an interface for communicating information to a customer relationship management (CRM) system; a processor in communication with the interface; and non-transitory computer readable media in communication with the processor that stores instruction code, which when executed by the processor, causes the processor to: receive historical customer relationship management data from the CRM system that defines historical information in relation to a customer; determine one or more parameters based on the received historical customer relationship management data, where the one or more parameters are defined to facilitate communication between the CGS and the CRM system; receive state information from the CRM system that defines a current interaction state between an agent of the CRM system and a customer, the state information including one of multiple scripted actions to guide the agent when interacting with the customer; generate a request for a next interaction state between the agent of the CRM system and the customer, the request including the one or more determined parameters and the received state information; in response to the request, predict, based on the historical customer relationship management data and the generated request, using one or more machine learning algorithms, a next interaction state between the agent of the CRM system and the customer; and communicate, in real time, the predicted next interaction state to an agent device to facilitate suggesting a next course of action for the agent to perform.

A2 The system of example A1, where the instruction code causes the processor to receive one or more pre-defined configuration rules, and the next interaction state is predicted based on the one or more pre-defined configuration rules.

A3 The system of either of examples A1 or A2, where the instruction code causes the processor to predict one or more products based on the predicted next interaction state, and to communicate the predicted one or more products to the agent device to facilitate suggesting, by the agent, one or more products to offer the customer.

A4 The system of any of examples A1-A3, where the predicted next interaction state is communicated to the agent device in a response to the generated request, the response including the one or more determined parameters and the predicted next interaction state.

A5 The system of any of examples A1-A4, where at least one of the one or more machine learning algorithms utilizes a long short-term memory (LSTM).

A6 The system of any of examples A1-A5, where the instruction code causes the processor to receive training data from the CRM system that includes customer information associated with multiple customers, where the one or more machine learning algorithms are trained using the training data.

A7 The system of any of examples A1-A6, where the customer information includes one or more of: customer biographic information, customer assets, customer order histories, case histories associated with customers, contract information associated with customers, and one or more product catalogs.

B1 In an example, a method for controlling a system to provide customer assistance includes: providing an interface for communicating information to a customer relationship management (CRM) system; receiving historical customer relationship management data from the CRM system that defines historical information in relation to a customer; determining one or more parameters based on the received historical customer relationship management data, where the one or more parameters are defined to facilitate communication between the CGS and the CRM system; receiving state information from the CRM system that defines a current interaction state between an agent of the CRM system and a customer, the state information including one of multiple scripted actions to guide the agent when interacting with the customer; generating a request for a next interaction state between the agent of the CRM system and the customer, the request including the one or more determined parameters and the received state information; in response to the request, predicting, based on the historical customer relationship management data and the generated request, using one or more machine learning algorithms, a next interaction state between the agent of the CRM system and the customer; and communicating, in real time, the predicted next interaction state to an agent device to facilitate suggesting a next course of action for the agent to perform.

B2 The method of example B1 further includes receiving one or more pre-defined configuration rules, where the next interaction state is predicted based on the one or more pre-defined configuration rules.

B3 The method of either of examples B1 or B2, further includes predicting one or more products and communicating the predicted one or more products to the CRM system to facilitate suggesting, by the agent, one or more products to offer the customer.

B4 The method of any of examples B1-B3, where the predicted next interaction state is communicated to the agent device in a response to the generated request, the response including the one or more determined parameters and the predicted next interaction state.

B5 The method of any of examples B1-B4, where at least one of the one or more machine learning algorithms utilizes a long short-term memory (LSTM).

B6 The method of any of examples B1-B5, further includes receiving training data from the CRM system that includes customer information associated with multiple customers, where the one or more machine learning algorithms are trained using the training data.

B7 The method of any of examples B1-B6, where the customer information includes one or more of: customer biographic information, customer assets, customer order histories, case histories associated with customers, contract information associated with customers, and one or more product catalogs.

C1 In an example, a non-transitory computer readable media that stores instruction code for controlling a system to provide customer assistance, the instruction code being executable by a machine for causing the machine to: receive historical customer relationship management data from the CRM system that defines historical information in relation to a customer; determine one or more parameters based on the received historical customer relationship management data, where the one or more parameters are defined to facilitate communication between the CGS and the CRM system; receive state information from a customer relationship management (CRM) system that defines a current interaction state between an agent of the CRM system and a customer, the state information including one of multiple scripted actions to guide the agent when interacting with the customer; generate a request for a next interaction state between the agent of the CRM system and the customer, the request including the one or more determined parameters and the received state information; in response to the request, predict, based on the historical customer relationship management data and the generated request, using one or more machine learning algorithms, a next interaction state between the agent of the CRM system and the customer; and communicate, in real time, the predicted next interaction state to an agent device to facilitate suggesting a next course of action for the agent to perform.

C2 The non-transitory computer readable media of example C1, where the instruction code causes the machine to receive one or more pre-defined configuration rules, and the next interaction state is predicted based on the one or more pre-defined configuration rules.

C3 The non-transitory computer readable media of either of examples C1 or C2, where the instruction code causes the machine to predict one or more products and to communicate the predicted one or more products to the CRM system to facilitate suggesting, by the agent, one or more products to offer the customer.

C4 The non-transitory computer readable media of examples C1-C3, where the predicted next interaction state is communicated to the agent device in a response to the generated request, the response including the one or more determined parameters and the predicted next interaction state.

C5 The non-transitory computer readable media of examples C1-C4, where at least one of the one or more machine learning algorithms utilizes a long short-term memory (LSTM).

C6 The non-transitory computer readable media of examples C1-C5, where the instruction code causes the machine to receive training data from the CRM system that includes customer information associated with multiple customers, where the one or more machine learning algorithms are trained using the training data.

D1 A method implemented by operation of a system of any of examples A1-A7.

E1 A non-transitory computer readable media that stores instruction code, the instruction code configured to cause a machine to implement the method of example D1.

Various implementations have been specifically described. However, many other implementations are also possible.

The methods and systems described herein may also be embedded in a computer program product, which includes all the features enabling the implementation of the operations described herein and which, when loaded in a computer system, is able to carry out these operations. Computer program as used herein refers to an expression, in a machine-executable language, code or notation, of a set of machine-executable instructions intended to cause a device to perform a particular function, either directly or after one or more of a) conversion of a first language, code, or notation to another language, code, or notation; and b) reproduction of a first language, code, or notation.

While methods and systems have been described with reference to certain embodiments, it will be understood by those skilled in the art that various changes may be made and equivalents may be substituted without departing from the scope of the claims. Therefore, it is intended that the present methods and systems not be limited to the particular embodiment disclosed, but that the disclosed methods and systems include all embodiments falling within the scope of the appended claims.

The invention claimed is:

1. A customer assistance guidance system (CGS) including:
an interface for communicating information to a customer relationship management (CRM) system;
a processor in communication with the interface; and
non-transitory computer readable media in communication with the processor that stores instruction code, which when executed by the processor, causes the processor to:
receive historical customer relationship management data from the CRM system that defines historical information in relation to a customer;
determine one or more parameters based on the received historical customer relationship management data, wherein the one or more parameters are defined to facilitate communication between the CGS and the CRM system;
receive state information from the CRM system that defines a current interaction state between an agent of the CRM system and a customer, the state information including one of multiple scripted actions to guide the agent when interacting with the customer;
generate a request for a next interaction state between the agent of the CRM system and the customer, the request including the one or more determined parameters and the received state information;
in response to the request, predict, based on the historical customer relationship management data and the generated request, using one or more machine learning algorithms, a next interaction state between the agent of the CRM system and the customer; and
communicate, in real time, the predicted next interaction state to an agent device to facilitate suggesting a next course of action for the agent to perform.

2. The system according to claim 1, wherein the instruction code causes the processor to receive one or more pre-defined configuration rules, and the next interaction state is predicted based on the one or more pre-defined configuration rules.

3. The system according to claim 1, wherein the instruction code causes the processor to predict one or more products based on the predicted next interaction state, and to communicate the predicted one or more products to the agent device to facilitate suggesting, by the agent, one or more products to offer the customer.

4. The system according to claim 1, wherein the predicted next interaction state is communicated to the agent device in a response to the generated request, the response including the one or more determined parameters and the predicted next interaction state.

5. The system according to claim 1, wherein at least one of the one or more machine learning algorithms utilizes a long short-term memory (LSTM).

6. The system according to claim 1, wherein the instruction code causes the processor to receive training data from the CRM system that includes customer information associated with multiple customers, wherein the one or more machine learning algorithms are trained using the training data.

7. The system according to claim 6, wherein the customer information includes one or more of: customer biographic information, customer assets, customer order histories, case histories associated with customers, contract information associated with customers, and one or more product catalogs.

8. A method for controlling a system to provide customer assistance, the method including:
providing an interface for communicating information to a customer relationship management (CRM) system;

receiving historical customer relationship management data from the CRM system that defines historical information in relation to a customer;

determining one or more parameters based on the received historical customer relationship management data, wherein the one or more parameters are defined to facilitate communication between the CGS and the CRM system;

receiving state information from the CRM system that defines a current interaction state between an agent of the CRM system and a customer, the state information including one of multiple scripted actions to guide the agent when interacting with the customer;

generating a request for a next interaction state between the agent of the CRM system and the customer, the request including the one or more determined parameters and the received state information;

in response to the request, predicting, based on the historical customer relationship management data and the generated request, using one or more machine learning algorithms, a next interaction state between the agent of the CRM system and the customer; and communicating, in real time, the predicted next interaction state to an agent device to facilitate suggesting a next course of action for the agent to perform.

9. The method according to claim 8, further including receiving one or more pre-defined configuration rules, wherein the next interaction state is predicted based on the one or more pre-defined configuration rules.

10. The method according to claim 8, further including predicting one or more products and communicating the predicted one or more products to the CRM system to facilitate suggesting, by the agent, one or more products to offer the customer.

11. The method according to claim 8, wherein the predicted next interaction state is communicated to the agent device in a response to the generated request, the response including the one or more determined parameters and the predicted next interaction state.

12. The method according to claim 8, wherein at least one of the one or more machine learning algorithms utilizes a long short-term memory (LSTM).

13. The method according to claim 8, further including receiving training data from the CRM system that includes customer information associated with multiple customers, wherein the one or more machine learning algorithms are trained using the training data.

14. The method according to claim 13, wherein the customer information includes one or more of: customer biographic information, customer assets, customer order histories, case histories associated with customers, contract information associated with customers, and one or more product catalogs.

15. A non-transitory computer readable media that stores instruction code for controlling a system to provide customer assistance, the instruction code being executable by a machine for causing the machine to:

receive historical customer relationship management data from the CRM system that defines historical information in relation to a customer;

determine one or more parameters based on the received historical customer relationship management data, wherein the one or more parameters are defined to facilitate communication between the CGS and the CRM system;

receive state information from a customer relationship management (CRM) system that defines a current interaction state between an agent of the CRM system and a customer, the state information including one of multiple scripted actions to guide the agent when interacting with the customer;

generate a request for a next interaction state between the agent of the CRM system and the customer, the request including the one or more determined parameters and the received state information;

in response to the request, predict, based on the historical customer relationship management data and the generated request, using one or more machine learning algorithms, a next interaction state between the agent of the CRM system and the customer; and communicate, in real time, the predicted next interaction state to an agent device to facilitate suggesting a next course of action for the agent to perform.

16. The non-transitory computer readable media according to claim 15, wherein the instruction code causes the machine to receive one or more pre-defined configuration rules, and the next interaction state is predicted based on the one or more pre-defined configuration rules.

17. The non-transitory computer readable media according to claim 15, wherein the instruction code causes the machine to predict one or more products and to communicate the predicted one or more products to the CRM system to facilitate suggesting, by the agent, one or more products to offer the customer.

18. The non-transitory computer readable media according to claim 15, wherein the predicted next interaction state is communicated to the agent device in a response to the generated request, the response including the one or more determined parameters and the predicted next interaction state.

19. The non-transitory computer readable media according to claim 15, wherein at least one of the one or more machine learning algorithms utilizes a long short-term memory (LSTM).

20. The non-transitory computer readable media according to claim 15, wherein the instruction code causes the machine to receive training data from the CRM system that includes customer information associated with multiple customers, wherein the one or more machine learning algorithms are trained using the training data.

* * * * *

UNITED STATES PATENT AND TRADEMARK OFFICE
CERTIFICATE OF CORRECTION

PATENT NO. : 11,080,717 B2
APPLICATION NO. : 16/592194
DATED : August 3, 2021
INVENTOR(S) : Coccia et al.

It is certified that error appears in the above-identified patent and that said Letters Patent is hereby corrected as shown below:

In the Specification

In Column 2, Line 54, before "subsystem 115" replace "A1" with --AI--.

In Column 3, Line 11, before "subsystem 115" replace "A1" with --AI--.

In Column 3, Line 21, before "Subsystem 115" replace "A1" with --AI--.

In Column 3, Line 22, before "algorithms" replace "A1" with --AI--.

In Column 3, Line 23, before "subsystem 115" replace "A1" with --AI--.

In Column 3, Line 42, before "sub-system 115" replace "A1" with --AI--.

In Column 4, Line 16, before "subsystem 115" replace "A1" with --AI--.

In Column 4, Line 32, before "subsystem 115" replace "A1" with --AI--.

In Column 12, Line 18, before "subsystem 115" replace "A1" with --AI--.

In Column 12, Line 33, before "subsystem 115" replace "A1" with --AI--.

In Column 13, Line 38, before "subsystem 115" replace "A1" with --AI--.

In Column 13, Line 52, before "subsystem 115" replace "A1" with --AI--.

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*